(12) United States Patent
Hung et al.

(10) Patent No.: US 11,507,485 B2
(45) Date of Patent: Nov. 22, 2022

(54) UNIVERSAL PROFILING DEVICE AND METHOD FOR SIMULATING PERFORMANCE MONITORING UNIT

(71) Applicant: REALTEK SEMICONDUCTOR CORPORATION, Hsinchu (TW)

(72) Inventors: Sheng-Kai Hung, Hsinchu (TW); Tsai-Chin Cheng, Hsinchu (TW); Yi-Kuan Wu, Hsinchu (TW); Ping-Hsiung Chiu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 130 days.

(21) Appl. No.: 17/102,469

(22) Filed: Nov. 24, 2020

(65) Prior Publication Data

US 2021/0165724 A1 Jun. 3, 2021

(30) Foreign Application Priority Data

Nov. 28, 2019 (TW) .................................. 108143433

(51) Int. Cl.
*G06F 11/00* (2006.01)
*G06F 11/34* (2006.01)
(Continued)

(52) U.S. Cl.
CPC ........ *G06F 11/3409* (2013.01); *G06F 11/302* (2013.01); *G06F 11/3072* (2013.01); *G06F 11/328* (2013.01)

(58) Field of Classification Search
CPC ............. G06F 11/3072; G06F 11/3096; G06F 11/302; G06F 11/323; G06F 11/328; G06F 11/3409; G06F 11/3461; G06F 11/3466
See application file for complete search history.

(56) References Cited

U.S. PATENT DOCUMENTS 6,594,774 B1 * 7/2003 Chapman .............. G06F 11/366
714/48
8,595,349 B1 * 11/2013 Wong .................. G06F 11/3096
714/48

(Continued)

FOREIGN PATENT DOCUMENTS

CN 103379000 A 10/2013
CN 103890693 A 6/2014

(Continued)

OTHER PUBLICATIONS

OA letter of the counterpart TW application (appl. No. 108143433) dated Jun. 29, 2021. Summary of the OA letter: Claims 1, 2, and 5 are rejected as being unpatentable (CN 103890693 A, also published as U.S. Pat. No. 9,360,917 B2, included in the IDS filed on Jan. 27, 2021) (TW I450104, also published as U.S. Pat. No. 9,360,917 B2, included in the IDS filed on Jan. 27, 2021) (TW 201140313 A1). Claims 3-4 and 6-10 are rejected as being unpatentable (CN 103379000 A).

(Continued)

*Primary Examiner* — Elmira Mehrmanesh
(74) *Attorney, Agent, or Firm* — WPAT, PC (57) ABSTRACT

Disclosed is a universal profiling device operable to simulate a performance monitoring unit for a heterogeneous system. The universal profiling device includes a main circuit and a storage circuit. The main circuit is configured to execute at least one of multiple steps including an active data collection step and a passive data collection step. The active data collection step registers a callback function for an event of a designated object according to predetermined setting or user setting, and actively calls the callback function to obtain information of the event. The passive data collection step registers the event of the designated object according to the predetermined setting or user setting and thereby receives (Continued)

the information of the event without requesting the designated object, wherein the information of the event is stored in the storage circuit.

16 Claims, 6 Drawing Sheets

(51) Int. Cl.
*G06F 11/30* (2006.01)
*G06F 11/32* (2006.01)

(56) References Cited

U.S. PATENT DOCUMENTS

| | | | |
|---|---|---|---|
| 9,268,611 B2 | 2/2016 | Iyer et al. | |
| 9,360,917 B2 | 6/2016 | Rogers et al. | |
| 10,203,974 B2* | 2/2019 | Barham | G06F 11/301 |
| 2006/0230391 A1* | 10/2006 | Alexander, III | G06F 11/3616 |
| | | | 717/130 |
| 2008/0196043 A1* | 8/2008 | Feinleib | G06F 11/0784 |
| | | | 718/1 |
| 2009/0293051 A1* | 11/2009 | Krywaniuk | G06F 8/658 |
| | | | 717/173 |
| 2010/0235836 A1* | 9/2010 | Bratanov | G06F 11/3466 |
| | | | 718/1 |
| 2017/0199800 A1* | 7/2017 | Johns | G06F 11/3409 |
| 2019/0370141 A1* | 12/2019 | Choi | G06F 11/3466 |

FOREIGN PATENT DOCUMENTS

| | | | |
|---|---|---|---|
| TW | 201140313 A | 11/2011 | |
| TW | 201140313 A1 | 11/2011 | |
| TW | 201229781 A | 7/2012 | |
| TW | I450104 B | 8/2014 | |

OTHER PUBLICATIONS

OA letter of the counterpart TW application (appl. No. 108143433) dated Jan. 7, 2021. Summary of the OA letter: Claims 1-10 are rejected as being unpatentable (CN 103890693 A, also published as U.S. Pat. No. 9,360,917 B2) (TW 1450104, also published as U.S. Pat. No. 9,360,917 B2).

OA letter of a counterpart CN application (appl. no. 202010258554.7) dated Mar. 29, 2022. Summary of the OA letter: Claims 1~10 are rejected under Chinese Patent Act §22-3 as being unpatentable over D1 (CN103890693A) in view of D2(TW201 229781A), D3(TW201140313A), and D4(CN103379000A).

\* cited by examiner

UNIVERSAL PROFILING DEVICE AND METHOD FOR SIMULATING PERFORMANCE MONITORING UNIT

BACKGROUND OF THE INVENTION

1. Field of the Invention

The present disclosure relates to a profiling device and method, especially to a universal profiling device and method.

2. Description of Related Art

When designing a system, a designer needs to find out software and/or hardware performance bottlenecks as references for design adjustment. Take a Linux kernel for example; a Linux kernel provides many mechanisms for profiling system performance, but most of these mechanisms are only suitable for profiling performance of the Linux kernel and are not suitable for a heterogeneous system.

In addition, although a performance monitoring unit (PMU) built in a hardware circuit is operable to function along with a performance event (pert) PMU interface provided by a Linux kernel, most hardware circuits except the central processing unit (CPU) do not have proper PMU drivers. Mechanisms such as an extended Berkeley Packet Filter (eBPF) and a user probing mechanism (uprobe) provided by other kinds of Linux kernels have their own usage limitations and problems.

Moreover, if a system incorporates additional external hardware circuits or some co-processors without PMU driver programs, the aforementioned mechanisms cannot associate information of PMUs inside these circuits or events generated by these circuits with this system's states, and thus a designer cannot do the complete analysis of the whole system.

SUMMARY OF THE INVENTION

An object of the present disclosure is to provide a universal profiling device and method. The device and method can prevent the problems of the prior arts.

An embodiment of the universal profiling device of the present disclosure is configured to operate in a device operating system environment for performing a data collection program to simulate a performance monitoring unit and thereby obtain information of a first designated object, wherein the first designated object is configured to operate in a first operating system environment that can be the same as or different from the device operating system environment. This embodiment includes a main circuit and a storage circuit. The main circuit is configured to perform at least one of multiple steps including an active data collection step and a passive data collection step. The active data collection step registers a first callback function for a first event of the first designated object according to predetermined setting or user setting, and actively calls the first callback function to obtain the information of the first event. The passive data collection step registers the first event of the first designated object according to the predetermined setting or the user setting, and passively receives the information of the first event to store the information of the first event in the storage circuit.

An embodiment of the universal profiling method of the present disclosure includes performing at least one of multiple steps. The multiple steps includes: an active data collection step registering a first callback function for a first event of the first designated object and a second callback function for a second event of the second designated object according to predetermined setting or user setting, and actively calling the first callback function and the second callback function to obtain information of the first event and information of the second event respectively; and a passive data collection step registering the first event of the first designated object and the second event of the second designated object according to the predetermined setting or the user setting, and passively receiving the information of the first event and the information of the second event to store the information of the first event and the information of the second event in a storage circuit respectively. This method embodiment further includes: based on universal time information provided by a universal timer, obtaining the universal time information related to the first event according to the information of the first event and obtaining the universal time information related to the second event according to the information of the second event; as a result, the information of the first event and the information of the second event are based on the same ground of time.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 1b shows a functional block diagram of an embodiment of the main circuit of FIG. 1a.

DETAILED DESCRIPTION OF THE PREFERRED EMBODIMENTS

The present disclosure includes a universal profiling device and method suitable for a heterogeneous system. However, the universal profiling device and method can be applied to a homogeneous system if such application is practicable.

Figure 1A:
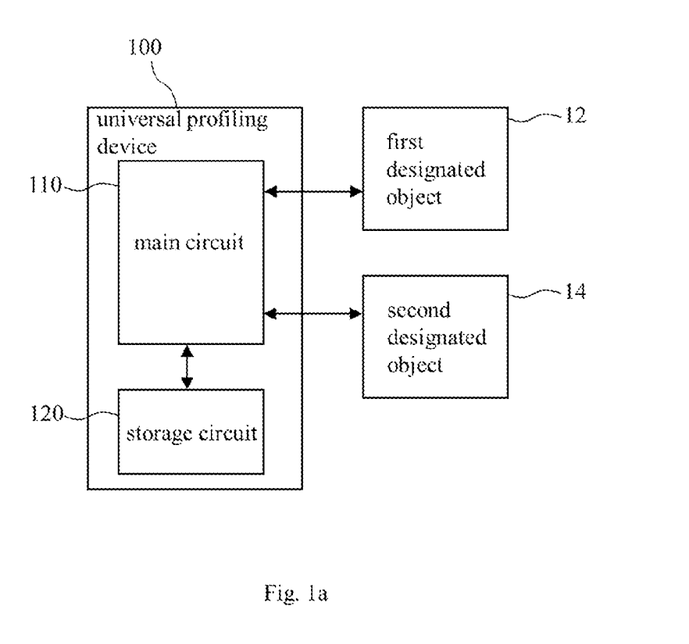
FIG. 1a shows an embodiment of the universal profiling device of the present disclosure.

FIG. 1a shows an embodiment of the universal profiling device of the present disclosure. The universal profiling device 100 of FIG. 1a is configured to operate in a device operating system (OS) environment (e.g., a Rich Execution Environment (REE) such as an open-source Linux environment; or a Trusted Execution Environment (TEE) such as OP-TEE) and perform a data collection program to simulate a performance monitoring unit (PMU) so as to obtain information of one or more designated objects for outputs. Each designated object operates in an OS environment; OS environments for different designated objects can be identical or different; and an OS environment for each designated object can be different from or the same as the device OS environment. Each designated object is a hardware circuit, a software program, or a combination of a hardware circuit and a software program; for example, each designated object is one of the following: a co-processor; a peripheral device; a trusted execution environment (TEE) device; a coexisting operating system (e.g., a trusted OS); a user application program; a central processing unit performance counter (CPU perf. Counter); an OS/driver program (OS/driver); a memory manager (e.g., ION of Android system); and a system monitoring device (e.g., a power/voltage/temperature monitor).

Please refer to FIG. 1a. The designated objects include a first designated object 12 (e.g., a co-processor) and a second designated object (e.g., a peripheral device). The first designated object 12 and the second designated object 14 operate in a first OS environment (e.g., a Linux environment, or a ucos (micro controller operating system) environment) and a second OS environment (e.g., a ucos environment, or a Free RTOS (real-time operating system) environment) respectively. The universal profiling device 100 includes a main circuit 110 and a storage circuit 120. The main circuit 110 is a single chip or is composed of a plurality of circuits (e.g., a general personal computer running Linux, or a known/self-developed embedded system), and is configured to perform the aforementioned data collection program and thereby perform at least one of multiple steps. The multiple steps include an active data collection step and a passive data collection step. The active data collection step is suitable for a designated object (e.g., a performance counter built in a CPU; or statistic information such as a memory usage status generated by Linux) capable of or operable to temporarily store the data it generates; therefore the main circuit 110 will actively request this kind of designated objects to provide its generated information. The passive data collection step is suitable for a designated object (e.g., a co-processor without any performance counter since its hardware design; or the internal information/status, that is not output in usual, generated during the operation process of a software, wherein an example is that the amount of memory used by a video playback software is the information/status not output during its operation process) incapable of or unsuitable for temporarily storing the data it generates; therefore this kind of designated objects will actively store the data it generates in the storage circuit 120 while the write-in timing can be determined by the occurrence of a registered event according to the demand for implementation, and then the main circuit 110 can query the storage circuit 120 at a proper time to obtain the stored data in accordance with the demand for implementation. The storage circuit 120 functions as a statistics pool and is designed for being used by multiple designated objects; each designated object can use the statistics pool via a shared memory interface, a file system interface, a remote procedure call (RPC), or other known/self-developed protocols/interfaces.

On the basis of the above description, the active data collection step is operable to register a first callback function for a first event of the first designated object and to register a second callback function for a second event of the second designated object, and to actively call the first callback function to obtain the information of the first event and to actively call the second callback function to obtain the information of the second event. It should be noted that a callback function can be defined by a user according to her/his demand for implementation, and the callback function is used for observing the data related to a specific event or the influence caused by the specific event. It should also be noted that the execution of "calling a callback function" can be realized with a function (e.g., a hook function, or a function pointer) of a known programming language or with another known or self-developed function. In addition, the active data collection step can optionally store the information of the first event and/or the information of the second event in the storage circuit 120. On the other hand, the passive data collection is operable to register the first event of the first designated object and the second event of the second designated object according to the predetermined setting or the user setting, to passively receive the information of the first event and the information of the second event, and then to store the information of the first event and the information of the second event in the storage circuit 120 respectively. Each of the aforementioned "callback function", "registering a callback function", "defining a callback function", "registering an event", and "calling a callback function" alone is known in this technical field, and their detail is omitted here.

Figure 1B:
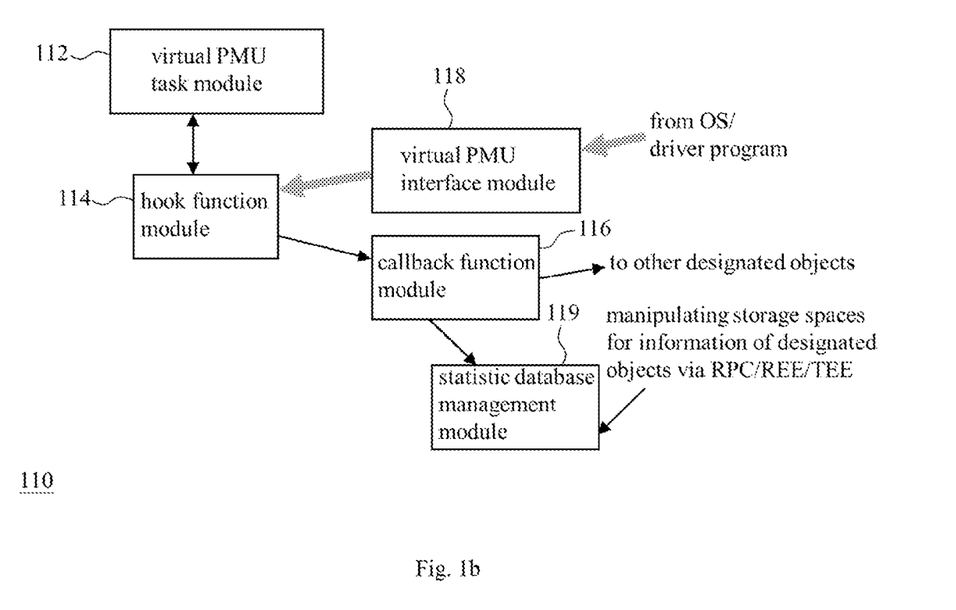

FIG. 1b shows a functional block diagram of an embodiment of the main circuit 110 of FIG. 1a. Each functional block in FIG. 1b can be realized in the form of a software module and/or a hardware circuit. The functional blocks of the main circuit 110 of FIG. 1b include: a virtual PMU task module 112 configured to communicate with the device OS and control the execution of the aforementioned multiple steps; at least a hook function module 114 configured to call at least one callback function module 116 according to the instruction from the virtual PMU task module 112; the at least one callback function module 116 configured to respond to the request from the hook function module 114 and thereby retrieve the information of at least one event of at least one designated object; a virtual PMU interface (virtual PMU I/F) module 118 configured to associate a callback function with the hook function module 114 and thereby wake up the callback function through the hook function module 114 to output the retrieved information to the virtual PMU task module 112; and a statistic database management module 119 configured to manipulate storage spaces so as to reserve a storage space of the storage circuit 120 for a designated object, if necessary. In an exemplary implementation, the virtual PMU interface module 118 performs the steps of FIG. 3 to fulfill its function. Since those having ordinary skill in the art can appreciate how to realize each module in FIG. 1b, their detail is omitted here.

Figure 2:
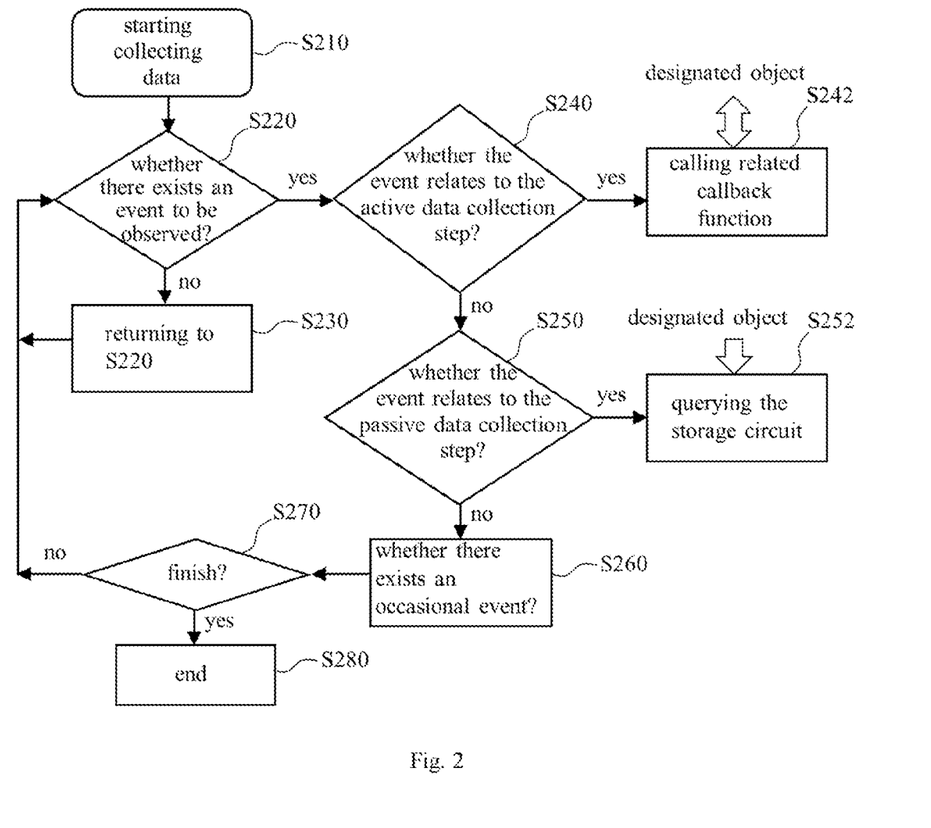
FIG. 2 shows an embodiment of the main circuit of FIG. 1a performing multiple steps to collect data.

FIG. 2 shows an embodiment of the main circuit 110 performing the multiple steps to collect data. This embodiment includes the following steps:

S210: starting collecting data.

S220: determining whether there exists an event to be observed, wherein the event is one of to-be-observed events that are predetermined or determined by a user; if so, going to step S240; and if not, going to step S230.

S230: on condition that there exists an event to be observed, returning to step S220.

S240: determining whether the event relates to the active data collection step; if so, going to step S242; and if not, going to step S250.

S242: actively calling a callback function associated with the event and thereby obtaining information of the event.

S250: determining whether the event relates to the passive data collection step; if so, going to step S252; and if not, going to step S260.

S252: querying the storage circuit 120 to obtain the information of the event.

S260: analyzing data of the storage circuit 120 to determine whether there exists an occasional event; and if so, analyzing the occasional event. For instance, the occasional event is an unexpected network disconnection event which usually has no need to be registered but can be registered.

S270: determining whether to finish collecting data; if so, going to step S280; and if not, going to step S220.

S280: ending data collection.

Figure 3:
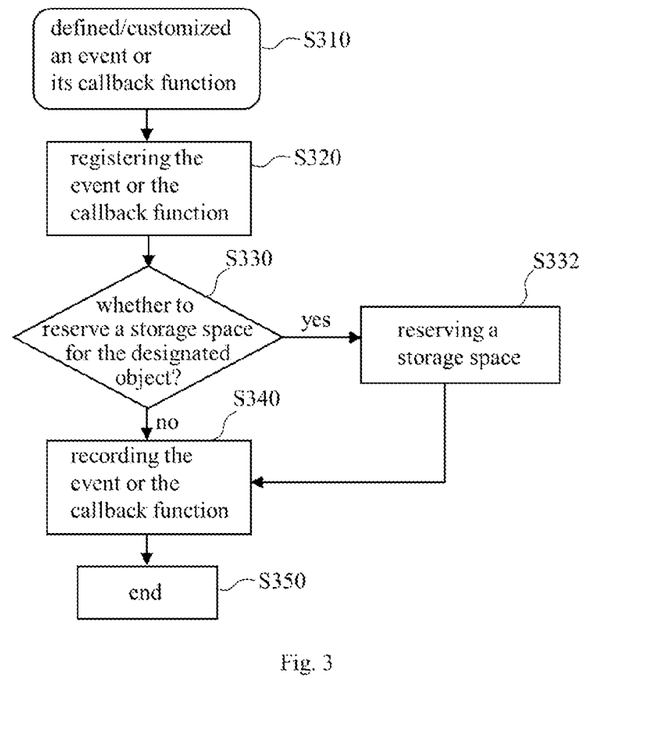
FIG. 3 shows an embodiment of registering an event of a designated object or registering a callback function for the event.

FIG. 3 shows an embodiment of registering an event of a designated object or registering a callback function for the event. This embodiment includes the following steps:

S310: defined/customized an event or a callback function for the event.

S320: registering the event or the callback function for the event.

S330: determining whether it is necessary to reserve a storage space from the storage circuit 120 for the designated object; if so, going to step S332; and if not, going to step S340. For instance, if the designated object is incapable of or unsuitable for temporarily storing data, this step reserve a storage space for the designated object; for another instance, if the designated object is capable of or suitable for storing data, this step can optionally reserve a storage space for the designated object.

S332: reserve a storage space for the designated object. It should be noted that this step can be realized with a well-known or self-developed memory allocation technique, and thus the detail is omitted here.

S340: recording the event or the callback function for the event.

S350: ending the process of registering the event or callback function.

Figure 4:
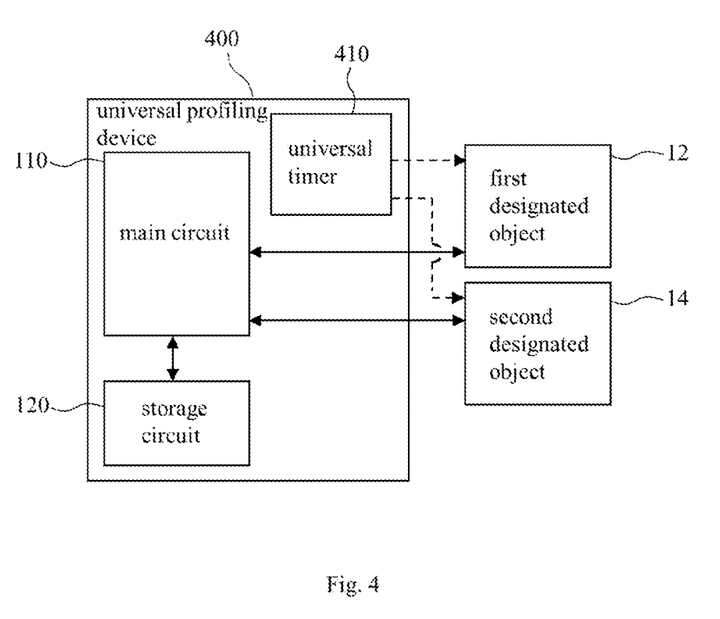
FIG. 4 shows another embodiment of the universal profiling device of the present disclosure.

FIG. 4 shows another embodiment of the universal profiling device of the present disclosure. Compared with FIG. 1, the universal profiling device 400 of FIG. 4 further includes a universal timer 410 configured to provide its time information (hereinafter referred to as "universal time information") as a universal time reference. In an exemplary implementation, the universal timer 410 provides the universal time information for the first/second designated object 12/14 (as indicated by the dashed lines in FIG. 4); therefore the first/second designated object 12/14 can adopt the universal time information and the information of the first/second event will include its own universal time information. It should be noted that the universal time information included in the information of the first/second event is dependent upon the occurrence of the first/second event, and thus the universal time information included in the information of the first event will be different from the universal time information included in the information of the second event if the two events occur at different time. In another exemplary implementation, the first/second designated object 12/14 adopts the first/second time information provided by a first/second timer so that the information of the first/second event includes the first/second time information; afterward, the main circuit 110 can determine the relation between the first/second timer and the universal timer 410 with a known or self-developed method such as setting access or message exchange, and then the main circuit 110 can convert the first/second time information included in the information of the first/second event into the universal time information. For instance, the relation between the first/second timer and the universal timer 410 includes an initial counting number difference between their initial counting numbers and a ratio of the counting speed of the universal timer 410 to the counting speed of the first/second timer; accordingly, the main circuit 110 can multiply the first/second time information (i.e., the counting number at the moment the event occurs) by the ratio and then add the multiplication product and the initial number difference to realize the conversion from the first/second time information to the universal time information.

Please refer to FIGS. 1a-1b. In an exemplary implementation, the aforementioned active data collection step includes: after the main circuit 110 obtains the information of the first event and the information of the second event, outputting the information of the first event and the information of the second event via the same interface (e.g., a Linux native interface) (not shown in the figures) through the mechanism provided by the device OS (e.g., the performance event (pert) mechanism provided by a Linux kernel) or a self-developed mechanism, wherein the information can be outputted via a network, a system file of the device OS, or a known or self-developed medium. In an exemplary implementation, the aforementioned passive data collection step includes: the main circuit 110 querying the storage circuit 120 to obtain the information of the first event and the information of the second event; and then outputting the information of the first event and the information of the second event via the same interface (e.g., a Linux native interface) through the mechanism provided by the device OS (e.g., the performance event (pert) mechanism provided by a Linux kernel) or a self-developed mechanism, wherein the information can be outputted via a network, a system file of the device OS, or a known or self-developed medium.

Figure 5:
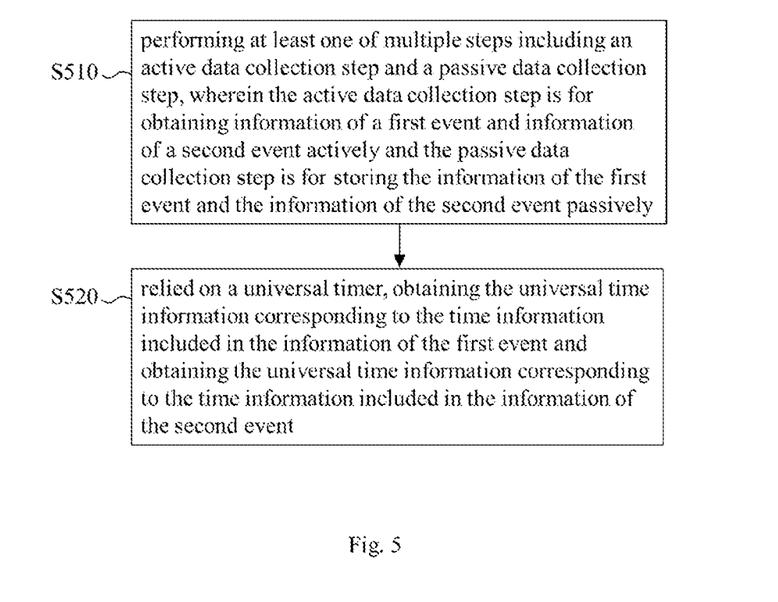
FIG. 5 shows an embodiment of the universal profiling method of the present disclosure.

FIG. 5 shows an embodiment of the universal profiling method of the present disclosure. This method embodiment can be carried out by the universal profiling device 100/400 of FIG. 1a/FIG. 4. The embodiment of FIG. 5 includes:

S510: performing at least one of multiple steps including an active data collection step and a passive data collection step, wherein the active data collection step is for obtaining information of a first event and information of a second event actively and the passive data collection step is for storing the information of the first event and the information of the second event passively.

S520: relied on a universal timer, obtaining the universal time information corresponding to the time information included in the information of the first event and obtaining the universal time information corresponding to the time information included in the information of the second event.

Since those having ordinary skill in the art can appreciate the detail and modification of the embodiment of FIG. 5 according to the disclosure of the embodiments of FIGS. 1a-4, which implies that the features of the embodiments of FIGS. 1a-4 can be applied to the embodiment of FIG. 5 in a logically way, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable, which implies that the way to implement the present invention can be flexibly.

To sum up, the universal profiling device and method can simulate a performance monitoring unit to obtain information of at least one designated object even though the at least one designated object does not have its own performance monitoring hardware circuit or software program.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A universal profiling device configured to operate in a device operating system environment for performing a data collection program to simulate a performance monitoring unit and thereby obtain information of a first designated object that is configured to operate in a first operating system environment, the universal profiling device comprising a main circuit, a storage circuit, and a universal timer, wherein
the main circuit is configured to perform at least one of multiple steps including:
an active data collection step registering a first callback function for a first event of the first designated object according to predetermined setting or user setting, and actively calling the first callback function to obtain information of the first event; and
a passive data collection step registering the first event of the first designated object according to the predetermined setting or the user setting, and passively receiving the information of the first event to store the information of the first event in the storage circuit;
the storage circuit is configured to store the information of the first event; and
the universal timer is configured to provide universal time information, wherein the first designated object adopts first time information provided by a first timer, the information of the first event includes the first time information, and the main circuit converts the first time information included in the information of the first event into the universal time information according to a relation between the first timer and the universal timer.

2. The universal profiling device of claim 1, wherein the device operating system environment is an open source operating system environment.

3. The universal profiling device of claim 1, wherein the device operating system environment is different from the first operating system environment.

4. The universal profiling device of claim 1, wherein the first designated object is one of the following: a co-processor; a peripheral device; a coexisting operating system; a user application program; a central processing unit (CPU) performance counter; an operating system/driver program; a memory manager; and a system monitoring device.

5. The universal profiling device of claim 1, wherein the active data collection step includes: storing the information of the first event in the storage circuit.

6. The universal profiling device of claim 1, wherein the passive data collection step includes: reserving a first storage space of the storage circuit for the first designated object.

7. The universal profiling device of claim 1, wherein the multiple steps further include: an occasional event analysis step for analyzing data of the storage circuit to determine whether an occasional event exists.

8. The universal profiling device of claim 1, wherein the active data collection step further registers a second callback function for a second event of a second designated object according to the predetermined setting or the user setting, and actively calls the second callback function to obtain information of the second event; the passive data collection step further registers the second event of the second designated object according to the predetermined setting or the user setting, and passively receives the information of the second event to store the information of the second event in the storage circuit; and the second designated object is configured to operate in a second operating system environment.

9. The universal profiling device of claim 8, wherein the second operating system environment is different from the first operating system environment.

10. The universal profiling device of claim 8, wherein the active data connection collection step includes: after obtaining the information of the first event and the information of the second event, outputting the information of the first event and the information of the second event via a same interface.

11. The universal profiling device of claim 8, wherein the passive data collection step includes: querying the storage circuit to obtain the information of the first event and the information of the second event, and then outputting the information of the first event and the information of the second event via a same interface.

12. A universal profiling method, comprising:
performing at least one of multiple steps including:
an active data collection step registering a first callback function for a first event of the first designated object and a second callback function for a second event of the second designated object according to predetermined setting or user setting, and actively calling the first callback function and the second callback function to obtain information of the first event and information of the second event respectively; and
a passive data collection step registering the first event of the first designated object and the second event of the second designated object according to the predetermined setting or the user setting, and passively receiving the information of the first event and the information of the second event so as to store the information of the first event and the information of the second event in a storage circuit respectively; and
based on universal time information provided by a universal timer, obtaining the universal time information related to the first event according to the information of the first event and obtaining the universal time information related to the second event according to the information of the second event,
wherein the first designated object adopts first time information provided by a first timer, the second designated object adopts second time information provided by a second timer, the information of the first event includes the first time information, the information of the second event includes the second time information, and the universal profiling method further comprises: converting the first time information included in the information of the first event into the universal time information according to a relation between the first timer and the universal timer; and converting the second time information included in the information of the second event into the universal time information according to a relation between the second timer and the universal timer.

13. The universal profiling method of claim 12, wherein the universal profiling method is carried out by a universal profiling device operating in a device operating system environment, the first designated object operates in a first operating system environment, the second designated object operates in a second operating system environment, and at least two of the device operating system environment, the first operating system environment, and the second operating system environment are different.

14. The universal profiling method of claim 12, wherein the active data collection step includes: storing at least one of the information of the first event and the information of the second event in the storage circuit.

15. The universal profiling method of claim 12, wherein the passive data collection step includes at least one of the following: reserving a first storage space of the storage circuit for the first designated object; and reserving a second storage space of the storage circuit for the second designated object.

16. The universal profiling method of claim 12, wherein the multiple steps further include: an occasional event analysis step analyzing data of the storage circuit to determine whether there exists an occasional event.

* * * * *